US012715473B2

(12) United States Patent
Cho

(10) Patent No.: US 12,715,473 B2
(45) Date of Patent: Aug. 25, 2026

(54) VEHICLE AND CONTROL METHOD THEREOF

(71) Applicants: HYUNDAI MOTOR COMPANY, Seoul (KR); KIA CORPORATION, Seoul (KR)

(72) Inventor: Jeongmin Cho, Hwaseong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 324 days.

(21) Appl. No.: 18/218,310

(22) Filed: Jul. 5, 2023

(65) Prior Publication Data

US 2024/0132107 A1 Apr. 25, 2024

(30) Foreign Application Priority Data

Oct. 14, 2022 (KR) ........................ 10-2022-0132024

(51) Int. Cl.
*B60W 60/00* (2020.01)
*B60W 40/04* (2006.01)

(52) U.S. Cl.
CPC ........ *B60W 60/0016* (2020.02); *B60W 40/04* (2013.01)

(58) Field of Classification Search
CPC ............. B60W 60/0016; B60W 40/04; B60W 2050/0031; B60W 30/0953; B60W 30/0956; B60W 30/18163; B60W 60/0011; B60W 2050/0025; B60W 50/0097; B60W 2520/105; B60W 2520/14; B60W 30/095;
(Continued)

(56) References Cited

U.S. PATENT DOCUMENTS 11,807,272 B2 * 11/2023 Wulfe ...................... G06N 3/09
12,179,755 B2 * 12/2024 Yasui ............. B60W 60/00276
(Continued)

FOREIGN PATENT DOCUMENTS

CN 110834644 B 1/2021
CN 112347567 A 2/2021
(Continued)

OTHER PUBLICATIONS

Kim, May 26, 2021, IEEE, "Hybrid Approach for Vehicle Trajectory Prediction Using Weighted Integration of Multiple Models" (Year: 2021).*

(Continued)

*Primary Examiner* — Fadey S. Jabr
*Assistant Examiner* — Mark Robert Heim
(74) *Attorney, Agent, or Firm* — Morgan, Lewis & Bockius LLP

(57) ABSTRACT

Described herein is a vehicle and a control method thereof. The vehicle includes a maneuver sensor provided to obtain maneuver data of the vehicle, a vehicle environment sensor provided to obtain lane information of a road on which the vehicle is traveling, and a controller electrically connected to the vehicle environment sensor, wherein the controller predicts a first trajectory of the vehicle based on a physics-based model using the maneuver data, predicts a second trajectory of the vehicle based on a maneuver-based model using the maneuver data and the lane information, and predicts a final trajectory of the vehicle based on the first trajectory and the second trajectory.

15 Claims, 12 Drawing Sheets

(58) Field of Classification Search
CPC .... B60W 40/02; B60W 40/09; B60W 40/107; B60W 40/114; B60W 2050/0022; B60W 2540/30
See application file for complete search history.

(56) References Cited

U.S. PATENT DOCUMENTS

| | | | | |
|---|---|---|---|---|
| 2005/0192736 | A1* | 9/2005 | Sawada | G09B 23/00 701/117 |
| 2010/0082195 | A1* | 4/2010 | Lee | B62D 15/0255 701/25 |
| 2014/0336844 | A1* | 11/2014 | Schwindt | B60W 50/0097 701/1 |
| 2018/0281814 | A1* | 10/2018 | Murray | B60W 30/12 |
| 2019/0184987 | A1* | 6/2019 | Lee | G01S 13/726 |
| 2020/0225669 | A1* | 7/2020 | Silva | G01S 17/06 |
| 2020/0258380 | A1* | 8/2020 | Wissing | G08G 1/04 |
| 2021/0009060 | A1* | 1/2021 | Huang | G06F 18/2413 |
| 2021/0040300 | A1 | 2/2021 | Doufas et al. | |
| 2021/0163010 | A1* | 6/2021 | Takabayashi | G08G 1/16 |
| 2021/0237769 | A1* | 8/2021 | Ostafew | G08G 1/042 |
| 2021/0269059 | A1* | 9/2021 | Djuric | G01C 21/3407 |
| 2022/0063651 | A1* | 3/2022 | Dai | B60W 60/001 |
| 2022/0092316 | A1* | 3/2022 | Bauch | G06F 18/00 |
| 2022/0184807 | A1* | 6/2022 | Bai | B25J 9/1664 |
| 2023/0166768 | A1* | 6/2023 | Wedajo | B60W 30/0956 701/23 |
| 2024/0025449 | A1* | 1/2024 | Wulfe | G08G 1/22 |
| 2025/0065922 | A1* | 2/2025 | Hoang | B60W 60/00274 |
| 2025/0269877 | A1* | 8/2025 | Bagnell | B60W 60/0015 |
| 2025/0333076 | A1* | 10/2025 | Djuric | B60W 60/001 |

FOREIGN PATENT DOCUMENTS

| | | | | |
|---|---|---|---|---|
| CN | 115009275 | A * | 9/2022 | B60W 60/0017 |
| EP | 3855120 | A1 * | 7/2021 | G06N 3/044 |
| JP | 4361389 | B2 | 11/2009 | |
| KR | 10-2395285 | B1 | 5/2022 | |
| WO | 2020-164089 | A | 8/2020 | |
| WO | WO-2020164089 | A1 * | 8/2020 | G06N 3/08 |
| WO | WO-2023222165 | A1 * | 11/2023 | G08G 1/165 |

OTHER PUBLICATIONS

Xie, Jul. 2018, IEEE, "Vehicle Trajectory Prediction by Integrating Physics- and Maneuver-Based Approaches Using Interactive Multiple Models" (Year: 2018).*

Houenou, Nov. 2013, IEEE, "Vehicle Trajectory Prediction based on Motion Model and Maneuver Recognition" (Year: 2013).*

Lefevre, Robomech, 2014, "Motion Prediction and Risk Assessment for Intelligent Vehicles" (Year: 2014).*

WO-2023222165-A1 machine translation (Year: 2023).*

CN-115009275-A machine translation (Year: 2022).*

G. Kim, D. Kim, Y. Ahn and K. Huh, "Hybrid Approach for Vehicle Trajectory Prediction Using Weighted Integration of Multiple Models," in IEEE Access, vol. 9, pp. 78715-78723, 2021, doi: 10.1109/ACCESS.2021.3083918.

Lefevre, S., Vasquez, D. & Laugier, C. "A survey on motion prediction and risk assessment for intelligent vehicles". Robomech J 1, 1 (2014). https://doi.org/10.1186/s40648-014-0001-z.

* cited by examiner

FIG. 1

DRIVING
200
PHYSICS-BASED MODEL TRAJECTORY PREDICTION
210
MANEUVER-BASED MODEL TRAJECTORY PREDICTION
220
MODEL INTEGRATION TRAJECTORY PREDICTION
221
SHORT TERM ( 0~1 sec )
PHYSICS-BASED MODEL
222
MEDIUM TERM ( 1~2 sec )
INTEGRATED MODEL
223
LONG TERM ( 2~4 sec )
MANEUVER-BASED MODEL
FINAL PREDICTED VEHICLE DRIVING TRAJECTORY

VEHICLE AND CONTROL METHOD THEREOF

CROSS-REFERENCE TO RELATED APPLICATION(S)

The present application is based on and claims priority to Korean Patent Application No. 10-2022-0132024, filed on Oct. 14, 2022, in the Korean intellectual Property Office, the contents of which is incorporated by reference herein in its entirety.

BACKGROUND OF THE PRESENT DISCLOSURE

1. Field of the Present Disclosure

The disclosure relates to a vehicle capable of predicting a driving trajectory of the vehicle and a control method thereof.

2. Description of the Related Art

Various advanced driver assistance systems (ADAS) have been developed to assist drivers in complex traffic situations or to perform autonomous driving.

An example of an advanced driver assistance system installed in a vehicle, is a forward collision avoidance (FCA) system. Such a system allows a vehicle to be driven within a lane, keep a safe distance, and furthermore, avoid a collision in critical situations.

It is important to accurately determine a crash situation because wrong control or non-control can cause a dangerous situation.

Conventionally, a trajectory of a vehicle is predicted using a physics-based model. The trajectory of the vehicle is predicted using a representative physics-based model such as a constant velocity model (CV model) and a constant acceleration model (CA model).

However, because sensor data is used in the case of trajectory prediction using this physics-based model, it is vulnerable to sensor noise, and because road information or an intention of a driver is not considered, accuracy in the trajectory prediction may be lowered.

SUMMARY

Various aspects of the present disclosure are directed to providing a vehicle capable of more accurately and reliably predicting a trajectory of the vehicle, and a control method thereof.

Various aspects of the present disclosure will be set forth in part in the description which follows and, in part, will be obvious from the description, or may be learned by practice of the disclosure.

In accordance with an aspects of the present disclosure, a vehicle includes a maneuver sensor provided to obtain maneuver data of the vehicle, a vehicle environment sensor provided to obtain lane information of a road on which the vehicle is traveling, and a controller electrically connected to the vehicle environment sensor, wherein the controller predicts a first trajectory of the vehicle based on a physics-based model using the maneuver data, predicts a second trajectory of the vehicle based on a maneuver-based model using the maneuver data and the lane information, and predicts a final trajectory of the vehicle based on the first trajectory and the second trajectory.

The physics-based model may include at least one of a constant velocity model (CV model) and a constant acceleration model (CA model).

The controller may predict a relative longitudinal position and relative lateral position of the vehicle depending on acceleration and a yaw rate of the vehicle assuming that the vehicle travels at constant acceleration based on the CA model, and predict the first trajectory based on the relative longitudinal position and relative lateral position.

The maneuver-based model may simulate a driving pattern of a driver using the maneuver data and the lane information.

The maneuver-based model may be a cubic polynomial curve model.

The controller may identify a driving pattern of a driver based on the cubic polynomial curve model, predict a maneuver of the vehicle according to the driving pattern, and predict the second trajectory based on the predicted maneuver.

The controller may derive an initial position and a final position of the vehicle from the cubic polynomial curve model, derive initial position conditions and final position conditions, determine model parameters including a lateral offset, lane heading angle, curvature, and curvature derivative based on the initial position conditions and the final position conditions, and predict the second trajectory by applying the model parameters to the cubic polynomial curve model.

The controller may apply a weighting to the first trajectory and the second trajectory based on an integrated model integrating the physics-based model and the maneuver-based model, and predict the final trajectory based on trajectories to which the weighting is applied.

The controller may apply a weighting to the first trajectory and the second trajectory depending on prediction time for predicting the trajectory of the vehicle, and predict the final trajectory based on the first trajectory and the second trajectory to which the weighting is applied.

The controller may apply a weighting to the first trajectory and the second trajectory according to a sigmoid function.

The controller may apply the weighting of the first trajectory higher than the weighting of the second trajectory since the prediction time is short and apply the weighting of the second trajectory higher than the weighting of the first trajectory since the prediction time is long.

The controller may predict the first trajectory as the final trajectory in a first prediction time interval, predict the final trajectory by applying the weighting to the first trajectory and the second trajectory in a second prediction time interval set longer than the first prediction time interval, and predict the second trajectory as the final trajectory in a third prediction time interval set longer than the second prediction time interval.

In accordance with aspects of the present disclosure, a control method of a vehicle includes obtaining maneuver data of the vehicle, obtaining lane information of a road on which the vehicle is traveling, predicting a first trajectory of the vehicle based on a physics-based model using the maneuver data, predicting a second trajectory of the vehicle based on a maneuver-based model using the maneuver data and the lane information, and predicting a final trajectory of the vehicle based on the first trajectory and the second trajectory.

The prediction of the first trajectory of the vehicle may include predicting a relative longitudinal position and relative lateral position of the vehicle based on the physics-based model including at least one of a constant velocity model (CV model) and a constant acceleration model (CA model), and predicting the first trajectory based on the relative longitudinal position and relative lateral position.

The prediction of the second trajectory of the vehicle may include identifying a driving pattern of a driver based on the maneuver-based model including a cubic polynomial curve model, predicting a maneuver of the vehicle according to the driving pattern, and predicting the second trajectory based on the predicted maneuver.

The prediction of the second trajectory of the vehicle may include deriving an initial position and a final position of the vehicle from the cubic polynomial curve model, deriving initial position conditions and final position conditions, determining model parameters including a lateral offset, lane heading angle, curvature, and curvature derivative based on the initial position conditions and the final position conditions, and predicting the second trajectory by applying the model parameters to the cubic polynomial curve model.

The prediction of the final trajectory of the vehicle may include applying a weighting to the first trajectory and the second trajectory based on an integrated model integrating the physics-based model and the maneuver-based model, and predicting the final trajectory based on trajectories to which the weighting is applied.

The prediction of the final trajectory of the vehicle may include applying a weighting to the first trajectory and the second trajectory according to a sigmoid function, and predicting the final trajectory based on the first trajectory and the second trajectory to which the weighting is applied.

The application of the weighting to the first trajectory and the second trajectory may include applying the weighting of the first trajectory higher than the weighting of the second trajectory since a prediction time of the sigmoid function is short, and applying the weighting of the second trajectory higher than the weighting of the first trajectory since the prediction time is long.

The prediction of the final trajectory of the vehicle may include predicting the first trajectory as the final trajectory in a first prediction time interval, predicting the final trajectory by applying the weighting to the first trajectory and the second trajectory in a second prediction time interval set longer than the first prediction time interval, and predicting the second trajectory as the final trajectory in a third prediction time interval set longer than the second prediction time interval.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 1 is a control block diagram of a vehicle according to an exemplary embodiment of the present disclosure;

DETAILED DESCRIPTION

Figure 2:
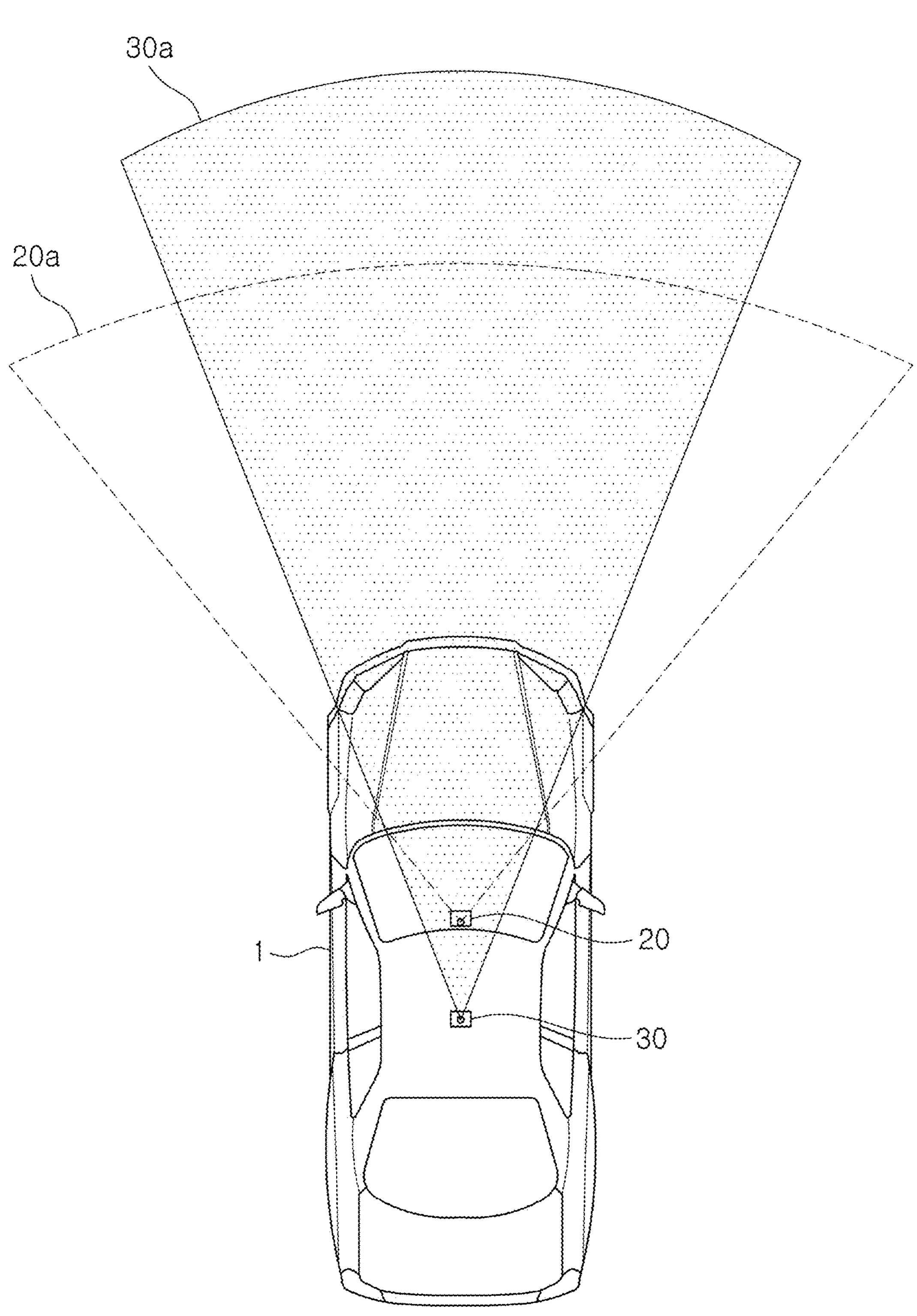
FIG. 2 illustrates a camera included in the vehicle according to an exemplary embodiment of the present disclosure.

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Throughout the specification, like reference numerals refer to like elements. This specification does not describe all factors of embodiments, and duplicative contents between general contents or embodiments in the technical field of the disclosure will be omitted. The terms 'member,' 'module,' and 'device' used in this specification may be embodied as software or hardware, and it is also possible for a plurality of 'members,' 'modules,' and 'devices' to be embodied as one component, or one 'member,' 'module,' and 'device' to include a plurality of components according to the embodiments.

Throughout the specification, when a part is referred to as being "connected" to another part, it includes not only a direct connection but also an indirect connection, and the indirect connection includes connecting through a wireless network.

When it is described that a part "includes" an element, it means that the element may further include other elements, not excluding the other elements unless specifically stated otherwise.

Throughout the specification, when an element is referred to as being located "on" or "over" another element, this includes not only a case in which an element is in contact with another element but also a case in which another element exists between the two elements.

The terms 'first,' 'second,' etc. are used to distinguish one element from another element, and the elements are not limited by the above-mentioned terms. The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

Figure 1:
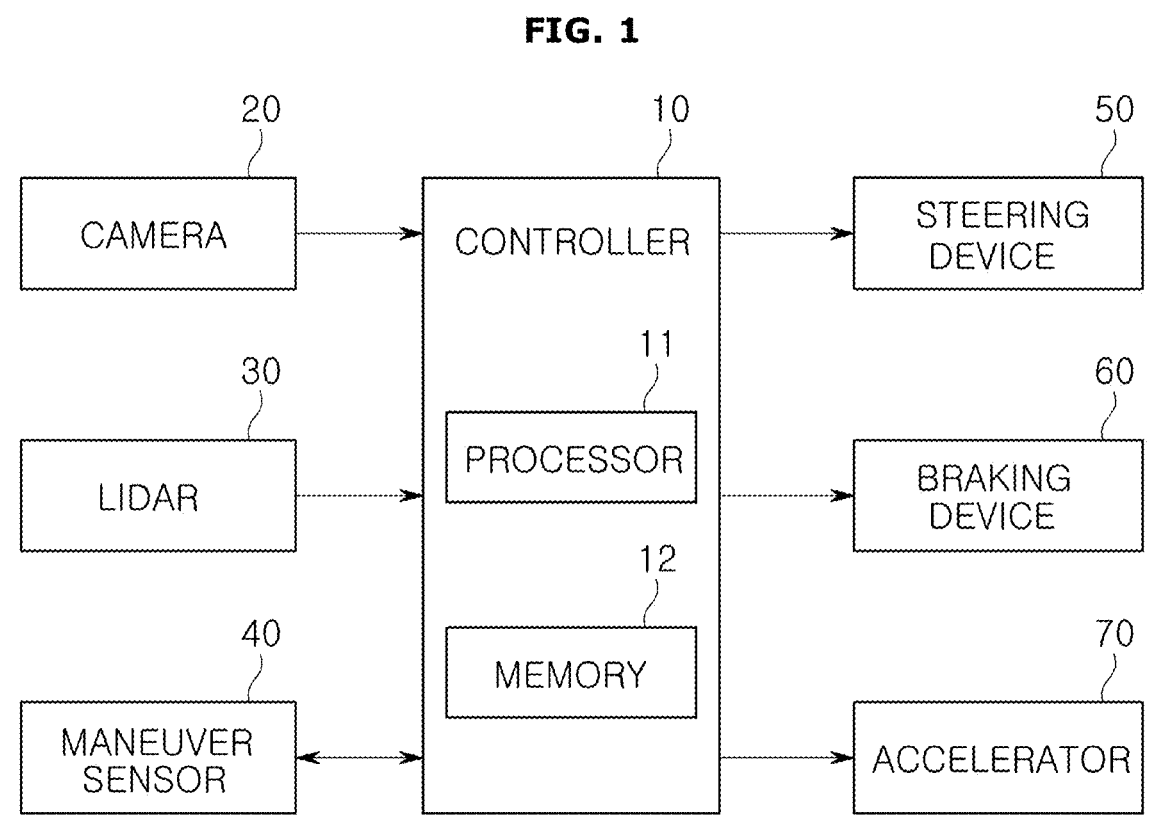

FIG. 1 is a control block diagram of a vehicle according to an exemplary embodiment of the present disclosure.

Referring to FIG. 1, a vehicle 1 may include a controller 10 configured to perform overall control.

A camera 20, a Light Detection and Ranging ("LIDAR sensor") sensor 30, and a maneuver sensor 40 may be electrically connected to the controller 10. The vehicle 1 is not limited to that illustrated in FIG. 1. For example, in the vehicle 1 illustrated in FIG. 1, at least one of the vehicle environment sensors 20 and 30 such as the camera 20 and LIDAR sensor 30 is omitted, or various sensing means capable of sensing lane information of a road on which the vehicle 1 is traveling may be added.

The controller 10, the camera 20 and the LIDAR sensor 30 may be provided separately from each other. For example, the controller 10 may be installed in a housing separate from a housing of the camera 20 and a housing of the LIDAR sensor 30. The controller 10 may exchange data with the camera 20 and/or the LIDAR sensor 30 through a wide-bandwidth network.

The controller 10, the camera 20, and the LIDAR sensor 30 may be configured to be integrated. For example, the camera 20 and the controller 10 may be provided in one housing, or the LIDAR sensor 30 and the controller 10 may be provided in one housing.

The camera 20 may photograph the surroundings of the vehicle 1 and obtain image data of the surroundings of the vehicle 1. For example, as illustrated in FIG. 2, the camera 20 may be installed on a front windshield of the vehicle 1, and may be a front camera including a field of view 20*a* facing the front of the vehicle 1.

The camera 20 may include a plurality of lenses and an image sensor. The image sensor may include a plurality of photodiodes that convert light into electrical signals, and the plurality of photodiodes may be arranged in a two-dimensional matrix.

The image data may include information on a lane of a road on which the vehicle 1 is traveling.

The vehicle 1 may include an image processor that processes the image data of the camera 20, and the image processor may be provided integrally with the camera 20 or integrally with the controller 10, for example.

The image processor may obtain the image data from the image sensor of the camera 20, and detect and identify objects around the vehicle 1 based on processing of the image data. For example, the image processor may generate tracks representing objects around the vehicle 1 using image processing and may classify the tracks. The image processor may identify whether the track is another vehicle or a road sign, and impart an identification code to the track.

The image processor may transmit data about the tracks around the vehicle 1 (hereinafter referred to as 'camera tracks') to the controller 10.

The LIDAR sensor 30 may emit light (e.g., infrared rays) toward the surroundings of the vehicle 1 and detect objects around the vehicle 1 based on light reflected from the surrounding objects. For example, the LIDAR sensor 30 may be installed on a roof of the vehicle 1 and may have a field of view facing a forward direction around the vehicle 1. As illustrated in FIG. 2, the LIDAR sensor 30 may have a forward-facing field of view 30*a* facing the forward direction.

The LIDAR sensor 30 may include a light source (e.g., light emitting diode, light emitting diode array, laser diode or laser diode array) that emits light (e.g., infrared rays) and an optical sensor (e.g., photodiode or photodiode array) that receives light (e.g., infrared rays). In addition, as necessary, the LIDAR sensor 30 may further include a driving device for rotating the light source and/or the optical sensor.

The LIDAR sensor 30 may emit light through the light source and receive light reflected from an object through the optical sensor while the light source and/or the optical sensor rotates, thereby obtaining LIDAR data.

The LIDAR data may include relative positions and/or relative velocities of objects around the vehicle 1.

Because the LIDAR sensor 30 has a wider angle of view than the camera 20 and is not affected by illumination, the LIDAR sensor 30 may replace the camera 20 by enabling stable recognition even at night or in environments with severe illumination changes. Because the LIDAR sensor 30 may use reflectance information of a road surface, a lane may be recognized by using the LIDAR sensor 30. That is, because reflectance is different depending on a material of the road surface, the reflectance of a lane for each road is high, and it is possible to recognize the lane using this property.

The vehicle 1 may include a signal processor capable of processing LIDAR data from the LIDAR sensor 30, and the signal processor may be provided integrally with the LIDAR sensor 30 or integrally with the controller 10, for example.

The signal processor may generate a track representing an object by clustering reflection points by reflected light. The signal processor may obtain a distance to the object based on, for example, a time difference between a light transmission time and a light reception time. Also, the signal processor may obtain a direction (or angle) of the object with respect to a traveling direction of the vehicle 1 based on a direction in which the light source emits light when the optical sensor receives the reflected light.

The signal processor may transmit data on tracks around the vehicle 1 (hereinafter referred to as 'LIDAR tracks') obtained from the LIDAR data to the controller 10.

The maneuver sensor 40 may obtain maneuver data representing movement of the vehicle 1. For example, the maneuver sensor 40 may include a speed sensor for detecting a wheel speed, an acceleration sensor for detecting lateral acceleration and/or longitudinal acceleration of the vehicle 1, and a yaw rate sensor for detecting a yaw rate of the vehicle 1, a steering angle sensor for detecting a steering angle of a steering wheel, a torque sensor for detecting a steering torque of the steering wheel, and the like. In addition, the maneuver sensor 40 may include an inertial measurement unit (IMU) to measure rotational motion information and acceleration information of the vehicle 1. The maneuver data may include the wheel speed, lateral acceleration, longitudinal acceleration, yaw rate, steering angle, steering torque, and the like. The maneuver sensor 40 may transmit the maneuver data to the controller 10. The controller 10 may also receive the maneuver data of the maneuver sensor 40 through a network.

The controller 10 may be electrically connected to the camera 20, the LIDAR sensor 30 and the maneuver sensor 40. Also, the controller 10 may be connected to a steering device 50, a braking device 60, and an accelerator 70 through a vehicle communication network NT. The vehicle communication network NT may be Ethernet, MOST (media-oriented systems transport), Flexray, CAN (controller area network), LIN (local interconnect network), and the like.

The controller 10 may process the camera track (or image data) of the camera 20 and/or the LIDAR track (or LIDAR data) of the LIDAR sensor 30, and provide control signals to the steering device 50, the braking device 60, the accelerator 70, and the like.

The controller 10 may include a processor 11 and a memory 12.

The memory 12 may store programs and/or data for processing the image data and/or LIDAR data. The memory 12 may store various models and programs for trajectory prediction of the vehicle 1. Also, the memory 12 may store programs and/or data for generating steering/braking/acceleration/suspension signals.

The memory 12 may temporarily store the image data received from the camera 20 and the LIDAR data received from the LIDAR sensor 30, and temporarily store a processing result of the image data and/or LIDAR data by the processor 141.

The memory 12 includes not only a volatile memory such as static random-access memory (S-RAM) and dynamic random-access memory (D-RAM), but also a non-volatile memory such as a flash memory, a read only memory (ROM), and an erasable programmable read only memory (EPROM).

The processor 11 may process the camera track of the camera 20 and/or the LIDAR track of the LIDAR sensor 30. For example, the processor 11 may fuse the camera track and/or the LIDAR track and output a fusion track.

The processor 11 may include the image processor processing the image data of the camera 20 and/or the signal processor processing the LIDAR data of the LIDAR sensor 30, or a micro control unit (MCU) generating steering/braking/acceleration/suspension signals.

The controller 10 may provide the steering signal, the braking signal, the acceleration signal, and/or the suspension signal based on the image data of the camera 20, the LIDAR data of the LIDAR sensor 30, and/or the maneuver data of the maneuver sensor 40.

The steering device 50 may include an electronic power steering control module (EPS). The steering device 50 may change the traveling direction of the vehicle 1, and the electronic steering control module may assist an operation of the steering device 50 so that a driver may easily manipulate the steering wheel in response to a steering intention of the driver through the steering wheel. The electronic steering control module may also control the steering device 50 in response to a request of the controller 10. For example, the electronic steering control module may receive the steering request including the steering torque from the controller 10 and control the steering device 50 to steer the vehicle 1 depending on the requested steering torque.

The braking device 60 stops the vehicle 1 and may include, for example, a brake caliper and an electronic brake control module (EBCM). The brake caliper may decelerate the vehicle 1 or stop the vehicle 1 by using friction with a brake disc, and the electronic brake control module may control the brake caliper in response to a braking intention of the driver through a brake pedal and/or a request from the controller 10. For example, the electronic brake control module may receive a deceleration request including a deceleration rate from the controller 10 and control the brake caliper electrically or hydraulically so that the vehicle 1 is decelerated depending on the requested deceleration rate.

The accelerator 70 moves the vehicle 1 and may include, for example, an engine, an engine management system (EMS), a transmission, and a transmission control unit (TCU). The engine generates power for the vehicle 1 to drive, and the engine management system may control the engine in response to an acceleration intention of the driver through an accelerator pedal or a request from the driver assistance device 100. The transmission decelerates and transmits the power generated by the engine to wheels, and the transmission control unit may control the transmission in response to a shift command of the driver through a shift lever and/or a request from the controller 10.

The controller 10 may obtain lane information (number of lanes, road location, lane location, vehicle width, etc.) of a road on which the vehicle 1 is traveling, based on the image data of the camera 20 and/or the LIDAR data of the LIDAR sensor 30. That is, the controller 10 may obtain the lane information of the vehicle 1 based on vehicle environment data of the vehicle environment sensors 20 and 30 such as the camera 20 and the LIDAR sensor 30.

The controller 10 may predict a first trajectory of the vehicle 1 based on the maneuver data of the maneuver sensor 40. The controller 10 may predict a second trajectory of the vehicle 1 based on the maneuver data of the maneuver sensor 40 and the vehicle environment data of the vehicle environment sensors 20 and 30. The controller 10 may predict a final trajectory by applying different weightings to the first trajectory and the second trajectory for each trajectory prediction time of the vehicle 1.

Figure 3:
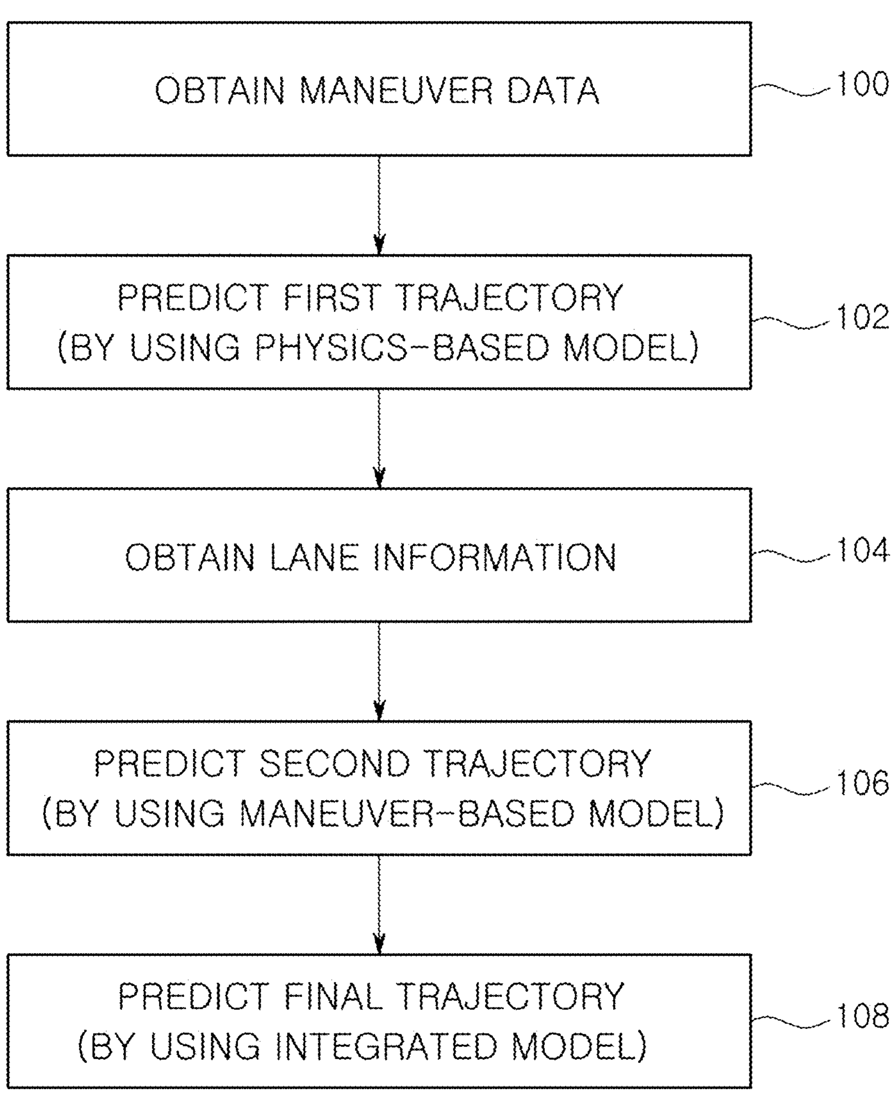
FIG. 3 is a flowchart of a control method of the vehicle according to an exemplary embodiment of the present disclosure.

FIG. 3 is a flowchart of a control method of the vehicle according to an embodiment.

Referring to FIG. 3, the vehicle 1 may obtain maneuver data representing the movement of the vehicle 1 (100).

The controller 10 may obtain the maneuver data of the vehicle 1 through the maneuver sensor 40. The maneuver data may include the vehicle speed, acceleration, and yaw rate of the vehicle 1.

The vehicle 1 may predict a first trajectory along which the vehicle 1 travels based on the maneuver data (102).

The vehicle 1 may predict the first trajectory along which the vehicle 1 travels by using a physics-based model.

The controller 10 may predict a trajectory of the vehicle 1 by applying the maneuver data to the physics-based model. The controller 10 may predict the trajectory of the vehicle 1 using the maneuver data in a representative physics-based model such as a constant velocity model (CV model) and a constant acceleration model (CA model).

For example, when the constant acceleration model (CA model) is used as the physics-based model, assuming that the vehicle 1 travels at constant acceleration, by predicting a relative longitudinal position and relative lateral position of the vehicle 1 using the acceleration and yaw rate of the vehicle 1, the first trajectory, which is the trajectory of the vehicle 1, may be predicted.

The vehicle 1 may obtain lane information of a road on which the vehicle 1 is traveling (104).

The controller 10 may obtain the lane information of the road on which the vehicle 1 is traveling based on the camera data of the camera 20 and/or the LIDAR data of the LIDAR sensor 30. The lane information may include the number of lanes, road location, lane location, vehicle width, and the like.

The vehicle 1 may predict a second trajectory along which the vehicle 1 travels based on the maneuver data and the lane information (106).

The vehicle 1 may predict the second trajectory along which the vehicle 1 travels by using a maneuver-based model.

The controller 10 may predict the trajectory of the vehicle 1 by applying the maneuver data and the lane information to the maneuver-based model.

The maneuver-based model, which is a model that simulates a driving pattern of a typical driver, may predict a maneuver of the vehicle 1 by grasping an intention of the driver utilizing the lane information of the road, and through this, the trajectory of the vehicle 1 may be predicted.

The vehicle 1 may predict a final trajectory along which the vehicle 1 travels by using an integrated model (108).

The controller 10 may predict the final trajectory of the vehicle 1 by applying a weighting to the first trajectory predicted by the physics-based model and the second trajectory predicted by the maneuver-based model.

The integrated model, which is a model that integrates the physics-based model and the maneuver-based model, may predict the final trajectory of the vehicle 1 by applying different weightings to the first trajectory predicted by the physics-based model and the second trajectory predicted by the maneuver-based model for each prediction time.

Figure 4:
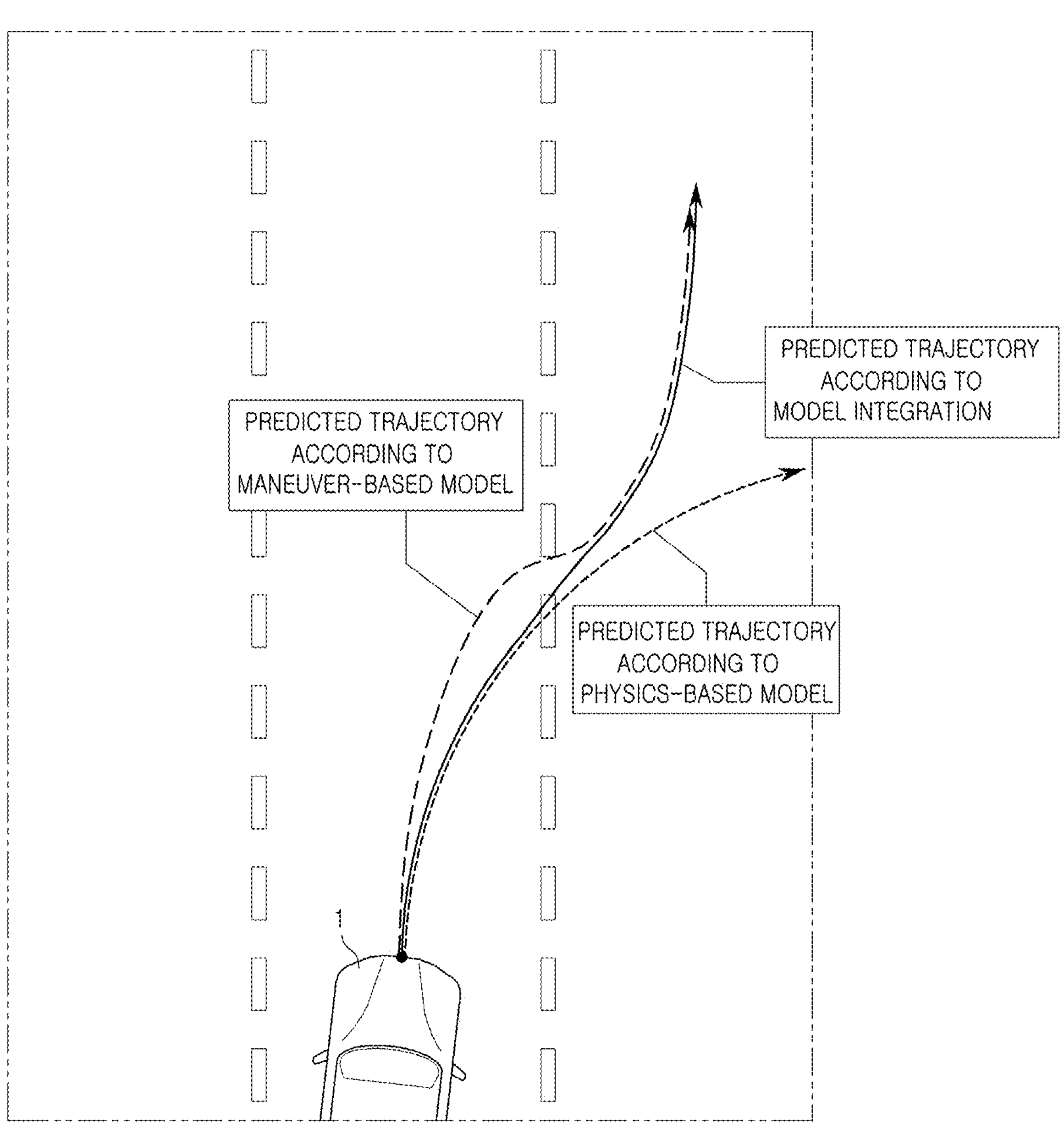
FIG. 4 is a diagram illustrating predicted trajectories based on a physics-based model, a maneuver-based model, and an integrated model, respectively, in the vehicle according to an exemplary embodiment of the present disclosure.

FIG. 4 is a diagram illustrating predicted trajectories based on the physics-based model, the maneuver-based model, and the integrated model, respectively, in the vehicle according to an embodiment.

Referring to FIG. 4, it is illustrated that the vehicle 1 changes the lane to the right lane.

A predicted trajectory based on the physics-based model, a predicted trajectory based on the maneuver-based model, and a predicted trajectory based on model integration are respectively illustrated.

A predicted trajectory according to the physics-based model is indicated by a short dotted line. The predicted trajectory according to the physics-based model is a trajectory generated based on the maneuver data obtained from the maneuver sensor 40 of the vehicle 1.

Because the predicted trajectory according to the physics-based model uses maneuver data representing an actual movement of a vehicle, the physics-based model shows high accuracy in short-time prediction.

However, because the predicted trajectory according to the physics-based model depends only on maneuver data, the physics-based model is vulnerable to sensor noise and does not consider road information or an intention of a driver, and thus the prediction accuracy may decrease over time. Therefore, there is a risk of mistaking that the vehicle 1 travels in a further rightward direction beyond changing the lane to the right lane, unlike an actual situation.

A predicted trajectory according to the maneuver-based model is indicated by a long dotted line. The predicted trajectory according to the maneuver-based model is a trajectory generated based on the lane information obtained by the vehicle environment sensor (camera and/or LIDAR sensor) together with the maneuver data of the vehicle 1.

Because the predicted trajectory according to the maneuver-based model predicts a maneuver of a vehicle by grasping a driving pattern of a typical driver based on the maneuver data and lane information, the maneuver-based model shows higher accuracy in relatively long-time prediction than in the case of the predicted trajectory according to the physics-based model.

However, in the case of a non-typical driving pattern, such as a sudden behavior of a driver, the prediction accuracy of the predicted trajectory according to the maneuver-based model may be significantly lowered. Because it takes time to accurately identify a driving pattern of a driver, although the prediction accuracy is high after the vehicle 1 has completed a lane change, the prediction accuracy may be low at the beginning of the lane change. Therefore, there is a risk of mistaking that the vehicle 1 changed the lane to the right lane late, unlike the actual situation.

A predicted trajectory according to the model integration is shown as a solid line.

The predicted trajectory according to the model integration is a final trajectory predicted using an integrated model that integrates the physics-based model and the maneuver-based model.

The predicted trajectory according to the model integration is the final trajectory generated by applying a weighting to the predicted trajectory according to the physics-based model and the predicted trajectory according to the maneuver-based model for each prediction time.

In the predicted trajectory according to the model integration, the predicted trajectory according to the physics-based model with high accuracy is used in the short-time prediction, and the predicted trajectory according to the maneuver-based model with high accuracy is used in the relatively long-time prediction. Therefore, the predicted trajectory according to the model integration has high accuracy for each prediction time.

HG, 5 is a diagram for explaining that a trajectory of the vehicle is finally predicted by integrating the physics-based model and the maneuver-based model in the vehicle according to an embodiment.

Figure 5:
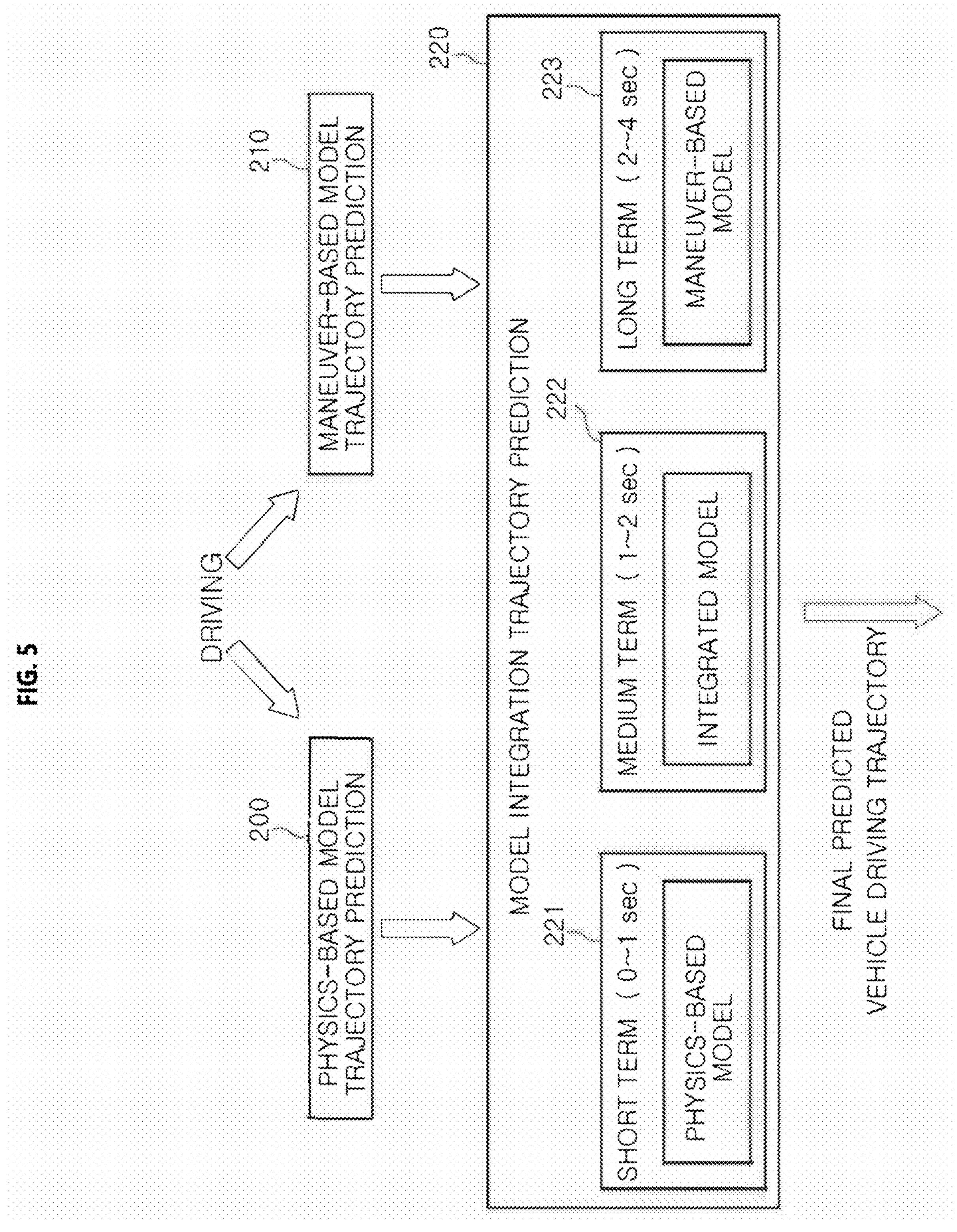
FIG. 5 is a diagram for explaining that a trajectory of the vehicle is finally predicted by integrating the physics-based model and the maneuver-based model in the vehicle according to an exemplary embodiment of the present disclosure.

Referring to FIG. 5, a process of predicting a final trajectory while the vehicle 1 is driving is illustrated.

A physics-based model trajectory prediction part 200 predicts a trajectory (first trajectory) of the vehicle 1 by using the physics-based model when the vehicle drives.

The physics-based model trajectory prediction part 200 generates a predicted trajectory according to the physics-based model by applying the maneuver data of the vehicle 1 to the physics-based model.

A maneuver-based model trajectory prediction part 210 predicts a trajectory (second trajectory) of the vehicle 1 by using the maneuver-based model when the vehicle 1 drives.

The maneuver-based model trajectory prediction part 210 generates a predicted trajectory according to the maneuver-based model by applying the lane information of the road together with the maneuver data of the vehicle 1 to the maneuver-based model.

A model integration trajectory prediction part 220 generates a final predicted trajectory, which is the final trajectory of the vehicle 1, by using both a vehicle position value of the physics-based model trajectory prediction and a vehicle position value of the maneuver-based model trajectory prediction.

The model integration trajectory prediction part 220 generates a final predicted trajectory by applying a weighting to two predicted vehicle position values depending on prediction time. The model integration trajectory prediction part 220 may apply a weighting to two predicted vehicle position values for each prediction time using a sigmoid function.

The model integration trajectory prediction part 220 may generate a short-term predicted trajectory of a short-term prediction interval 221 as the predicted trajectory according to the physics-based model. For example, the short-term prediction interval 221 may be an interval of 0 to 1 second. Because the accuracy of the predicted trajectory according to the physics-based model is high in the short-time prediction, the predicted trajectory according to the physics-based model may be used in the interval of 0 to 1 second.

The model integration trajectory prediction part 220 may generate a medium-term predicted trajectory of a medium-term prediction interval 222 with a predicted trajectory in which a weighting is applied to the predicted trajectory according to the physics-based model and the predicted trajectory according to the maneuver-based model. For example, the medium-term prediction interval 222 may be an interval of 1 to 2 seconds.

The model integration trajectory prediction part 220 may generate a long-term predicted trajectory of a long-term prediction interval 223 with the predicted trajectory according to the maneuver-based model. For example, the long-term prediction interval 223 may be an interval of 2 to 4 seconds. Because the accuracy of the predicted trajectory according to the maneuver-based model is high in long-time prediction, the predicted trajectory according to the maneuver-based model may be used in the interval of 2 to 4 seconds.

The model integration trajectory prediction part 220 may generate a final predicted trajectory by connecting the short-term predicted trajectory, the medium-term predicted trajectory, and the long-term predicted trajectory. This final predicted trajectory may be used as the final trajectory of the vehicle 1.

Therefore, the model integration trajectory prediction part 220 may predict the trajectory of the vehicle 1 to match a driving intention of an actual driver. The model integration trajectory prediction part 220 may generate a predicted trajectory that quickly follows the maneuver of the vehicle 1 and reflect the intention of the driver at the same time.

In the trajectory prediction according to the physics-based model, physical information (e.g., wheel speed, yaw rate, etc.) measurable by the maneuver sensor 40 of the vehicle 1 is utilized.

In the trajectory prediction according to the physics-based model, a final position of a vehicle is predicted by applying such physical information to vehicle curvature estimation based on kinematics. In the trajectory prediction according to the physics-based model, the maneuver of the vehicle 1 may be expressed only with a constant curvature.

Because in the trajectory prediction according to the physics-based model, the trajectory of the vehicle 1 may be predicted with a value including one curvature, when predicted in a short time, it is very sensitive to measured sensor values, and thus there is an advantage that a change in vehicle maneuver may be quickly followed.

However, because the measured sensor values are used in the trajectory prediction according to the physics-based model, there is a risk that an incorrect trajectory may be predicted due to sensor noise. In addition, because in the case of a sudden lane change, it may be predicted that the vehicle is located in a next lane of the next lane instead of the next lane, there is a risk that a trajectory that does not reflect the intention of a driver may be predicted.

As such, despite the high prediction accuracy in the short-time prediction in the trajectory prediction according to the physics-based model, because the trajectory prediction is greatly affected by sensor noise and is not suitable for reflecting the driving pattern of a driver, there is a disadvantage that the prediction accuracy is low in the long-time prediction.

Therefore, in order to increase the prediction accuracy in the long-time prediction, it is necessary to implement a model that simulates the driving pattern of a driver.

Figure 6:
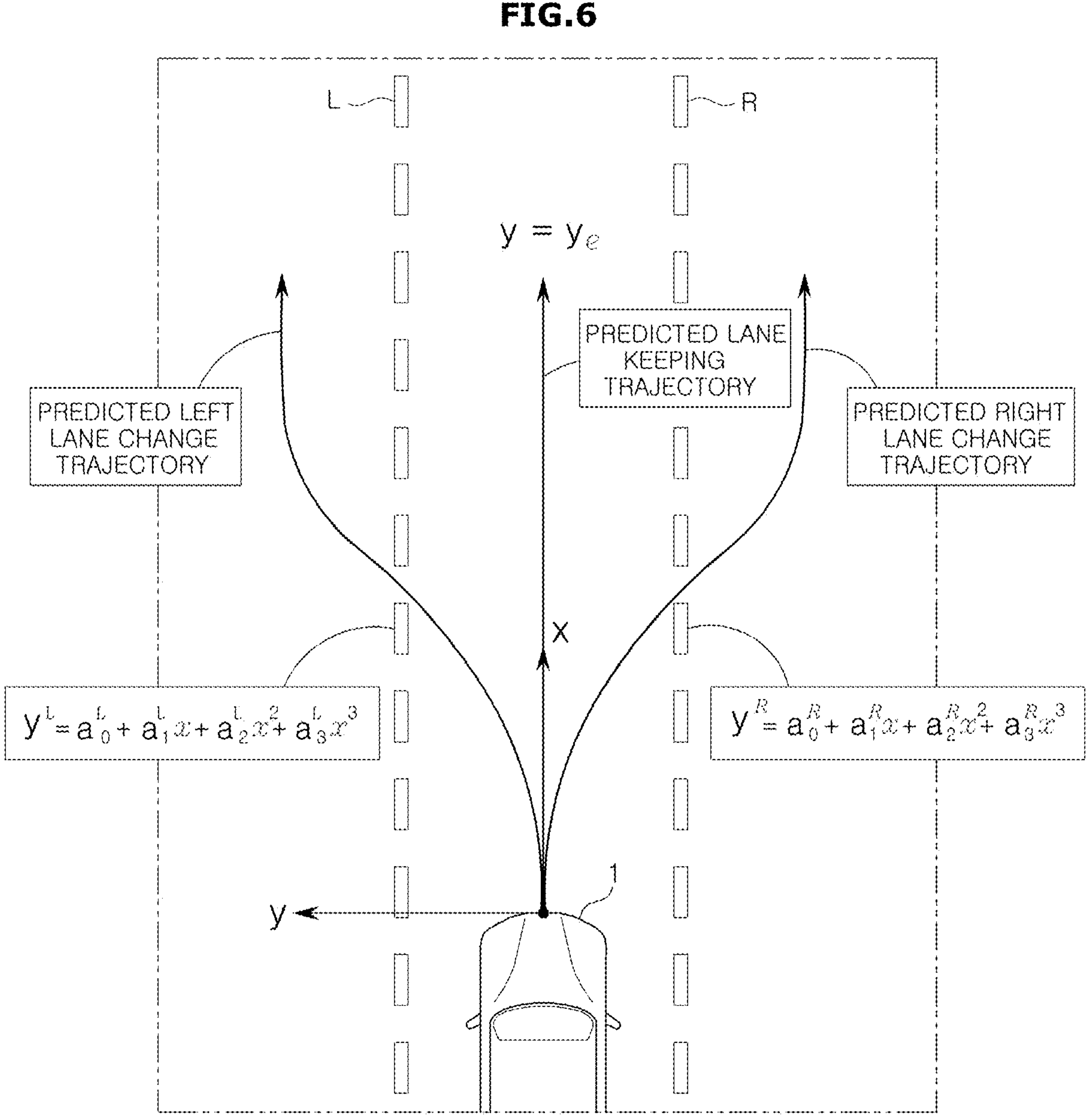
FIGS. 6 to 8 are diagrams for describing prediction of the trajectory of the vehicle using the maneuver-based model in the vehicle according to exemplary embodiments of the present disclosure.
Figure 7:
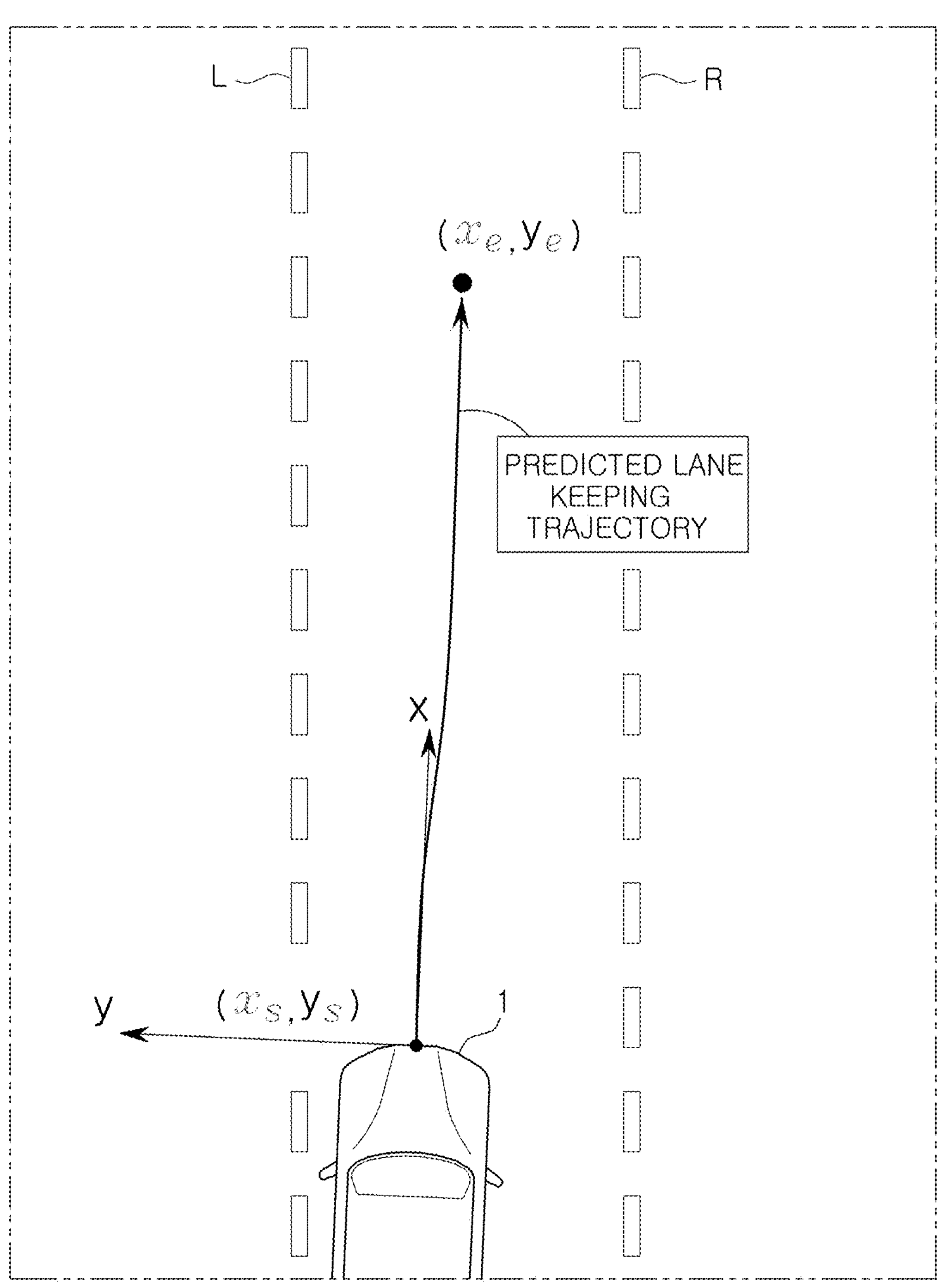
Figure 8:
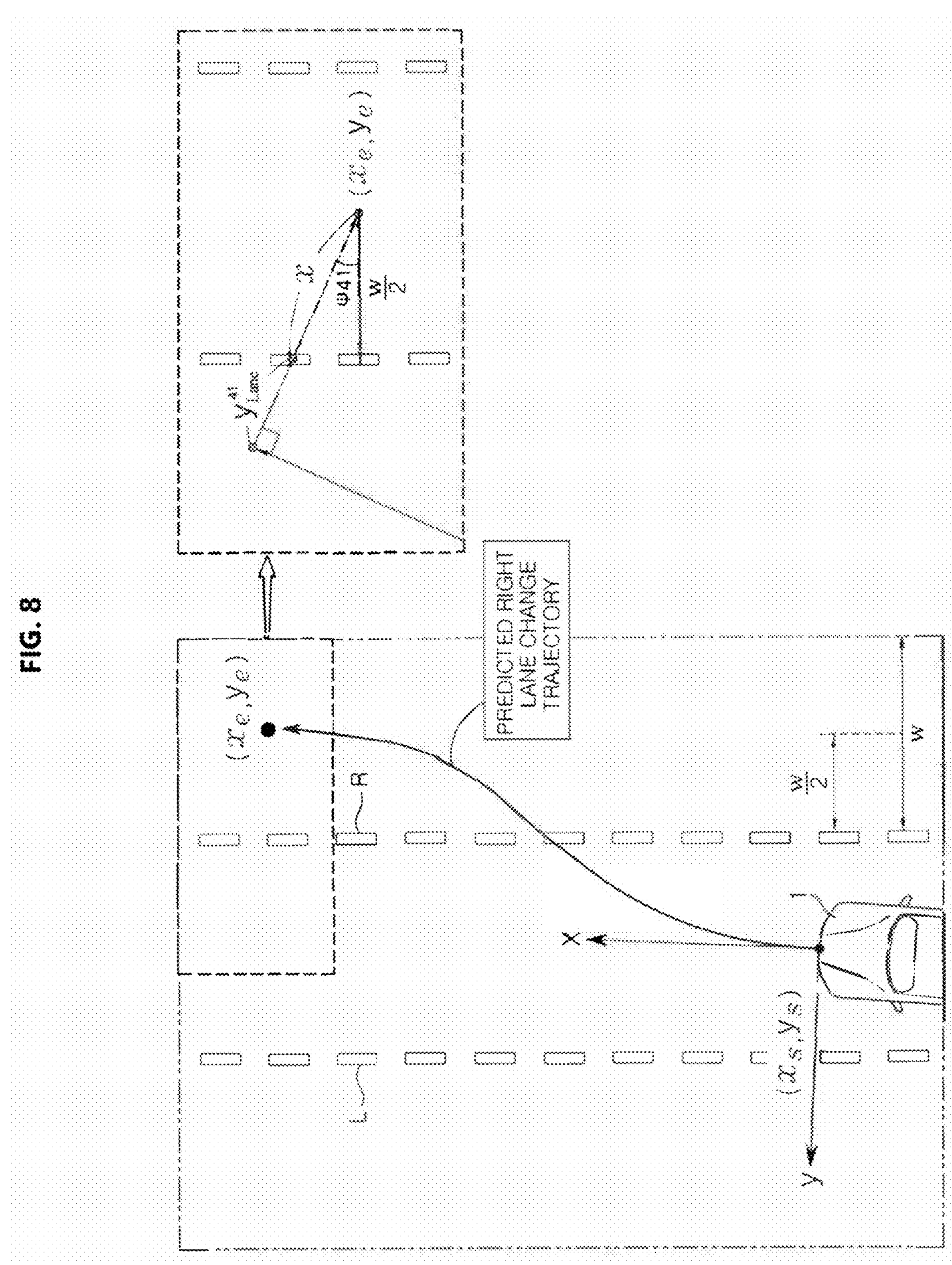

FIGS. 6 to 8 are diagrams for describing prediction of the trajectory of the vehicle using the maneuver-based model in the vehicle according to an embodiment.

Referring to FIGS. 6 to 8, the maneuver-based model is configured to utilize the lane information obtained by the vehicle environment sensor (the camera and/or LIDAR sensor 30).

The maneuver-based model is a model implemented to simulate a driving pattern of a typical driver for lane keeping and lane changing.

The maneuver-based model generates a trajectory that simulates a driving pattern of a typical driver by utilizing left and right lane information based on a coordinate system of the own vehicle. The generated trajectory may include a lane keeping trajectory, a left lane change trajectory, a right lane change trajectory, and the like.

The maneuver-based model may predict the trajectory of the vehicle 1 using a cubic polynomial curve model.

Four conditions are derived to determine model parameters for trajectory prediction in the cubic polynomial curve model, and a unique solution is determined from the corresponding conditions.

A final position ($x_e$, $y_e$) of the predicted trajectory is derived by utilizing a lateral offset and a heading angle with a lane at a look-ahead point. In the case of lane keeping, it is assumed that the final position is at the center of the current lane, in the case of a left lane change, it is assumed that the final position is at the center of the left lane, and in the case of a right lane change, it is assumed that the final position is at the center of the right lane.

When the above is expressed as an equation, it is as shown in equation [1] below.

$$yn(xn) = a_0 + a_1 x_n + a_2 x_n^2 + a_3 x_n^3 \qquad \text{Equation [1]}$$

$Y_n$ is a lateral position of the vehicle, $x_n$ is a longitudinal position of the vehicle, $a_0$ is a lateral offset, $a_1$ is a lane heading angle, $a_2$ is a curvature, and $a_3$ is a curvature derivative. A lane width (w) and a lane coefficient $$(a_n^{Lane}(n = 1, 2, 3/\text{Lane} = L, R)$$

are known values. The lane width and lane coefficient may be known from a relative positional relationship between the vehicle and the lane.

In the vehicle coordinate system, an x-axis points a forward direction and a y-axis points a leftward direction.

Differentiating equation [1] to determine a change in a lateral direction position of the vehicle 1 may be expressed as equation [2] below.

$$y_n' = a_1 + 2a_2 x_n + a_3 x_n^2 \qquad \text{Equation [2]}$$

Conditions at initial position are as equation [3] below.

$$(x_s, y_s) = (0, 0), \frac{dy_s}{dx_s} = 0 \qquad \text{Equation [3]}$$

Conditions at the final position are as equation [4] below.

$$(x_e, y_e) = (x_{41}, y_e), \frac{dy_e}{dx_e} = \psi_{41} \qquad \text{Equation [4]}$$

Herein, $x_{41}$ is a position at which the vehicle has moved for 4 seconds at a time step of 0.1 second with a vehicle speed measured from an initial position x+.

The unique solution of model parameters $a_1$, $a_2$, $a_3$, and $a_4$ may be expressed as the following equation [5] from the conditions of equations [3] and [4].

$$a_0 = 0, a1 = 0, a_2 = \frac{3y_e - \psi_{41}x_e}{x_e^2}, a_3 = \frac{\psi_{41}x_e - 2y_e}{x_e^3} \quad \text{Equation [5]}$$

Referring to FIG. 8, the final position ($x_e$, $y_e$) may be derived according to the lane information.
Because $$\cos\psi_{41} = \frac{\frac{w}{2}}{x} \text{ and } x = \frac{1}{\cos\psi_{41}} \cdot \frac{w}{2},$$

$y_e$ may be obtained by equation [6] below.

$$y_e = y_{Lane}^{41} + \frac{1}{\cos\psi_{41}} \cdot \frac{w}{2} \quad \text{Equation [6]}$$

Herein, $$y_{Lane}^{41}$$

is a lateral offset between the vehicle position value and the lane after 4 seconds, and $\psi_{41}$ is an angular difference between the vehicle and the lane.

As such, a corrected $y_e$ may be obtained by reflecting the lane change.

In the case of the left lane change, $y_e$ may be obtained by equation [7] below, as in the case of the right lane change.

$$y_e = y_{Lane}^{41} - \frac{1}{\cos\psi_{41}} \cdot \frac{w}{2} \quad \text{Equation [7]}$$

In the case of the lane keeping, $y_e$ may be derived with the center of the current lane.

In conclusion, when the final position ($x_e$, $y_e$) is known, the final trajectory may be predicted by equation [8] below.

$$y = \frac{\psi_{41}x_e - 2y_e}{x_e^3}x^3 + \frac{3y_e - \psi_{41}x_e}{x_e^2}x^2 \quad \text{Equation [8]}$$

As such, in the case of the lane keeping, right lane change, and left lane change, when each final position ($x_e$, $y_e$) is derived, the final trajectory may be predicted by equation [8] above.

Figure 9:
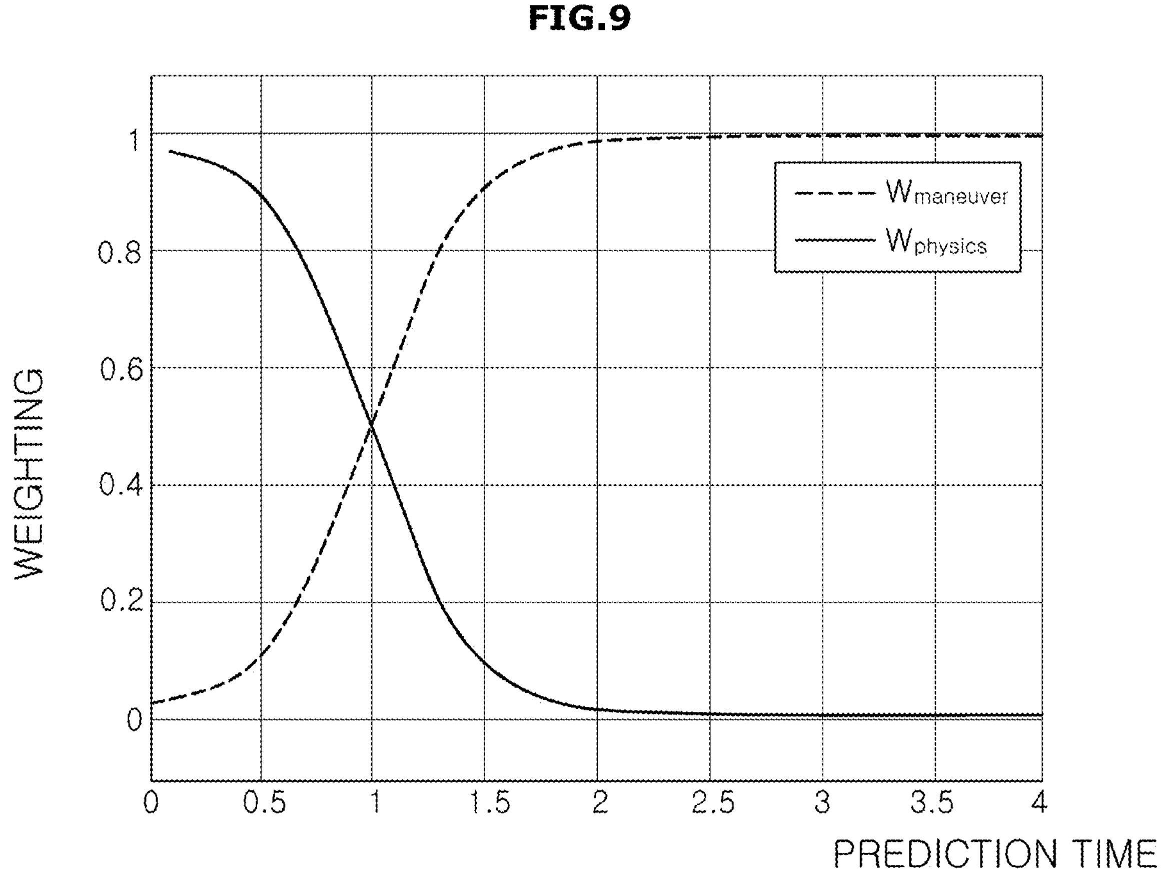
FIG. 9 is a graph for explaining model integration using a weighting function in the vehicle according to an exemplary embodiment of the present disclosure.

FIG. 9 is a graph for explaining model integration using a weighting function in the vehicle according to an exemplary embodiment of the present disclosure.

Referring to FIG. 9, in the trajectory prediction according to the maneuver-based model, the prediction inaccuracy may exist for a driving pattern that is not typical or a vehicle maneuver that may not be expressed from the maneuver-based model. For example, various vehicle maneuvers for lane change (e.g., aggressive lane change, defensive lane change, etc.) may occur, but all may not be reflected.

Therefore, by integrating the physics-based model and the maneuver-based model and applying a weighting to the physics-based model at a relatively short prediction time point and to the maneuver-based model at a relatively long prediction time point, the final trajectory of the vehicle 1 may be more accurately and reliably predicted.

FIG. 9 illustrates the sigmoid function used for weighting application.

In the sigmoid function, a horizontal axis represents prediction time, and a vertical axis represents a weighting.

The vehicle 1 may apply a weighting to two predicted vehicle position values for each prediction time using the sigmoid function.

Because in the prediction interval of Oto 1 second in the sigmoid function, the predicted trajectory according to the physics-based model has the high prediction accuracy, the vehicle 1 may apply a physics-based weighting ($W_{physics}$) higher than a maneuver-based model weighting ($W_{maneuver}$) in the prediction interval of 0 to 1 second.

In this case, the physics-based weighting ($W_{physics}$) may decrease exponentially, and the maneuver-based model weighting ($W_{maneuver}$) may increase exponentially.

On the contrary, in the prediction interval of 1 to 2 seconds in the sigmoid function, the vehicle 1 may apply the maneuver-based model weighting ($W_{maneuver}$) higher than the physics-based weighting ($W_{physics}$). In this case, the physics-based weighting ($W_{physics}$) may decrease exponentially, and the maneuver-based model weighting ($W_{maneuver}$) may increase exponentially.

Because in the prediction interval of 2 to 4 seconds in the sigmoid function, the predicted trajectory according to the maneuver-based model has high prediction accuracy, the vehicle 1 may keep the maneuver-based model weighting ($W_{maneuver}$) higher than the physics-based weighting ($W_{physics}$). In this case, the physics-based weighting ($W_{physics}$) may be kept at zero, and the maneuver-based model weighting ($W_{maneuver}$) may be kept at one.

Figure 10:
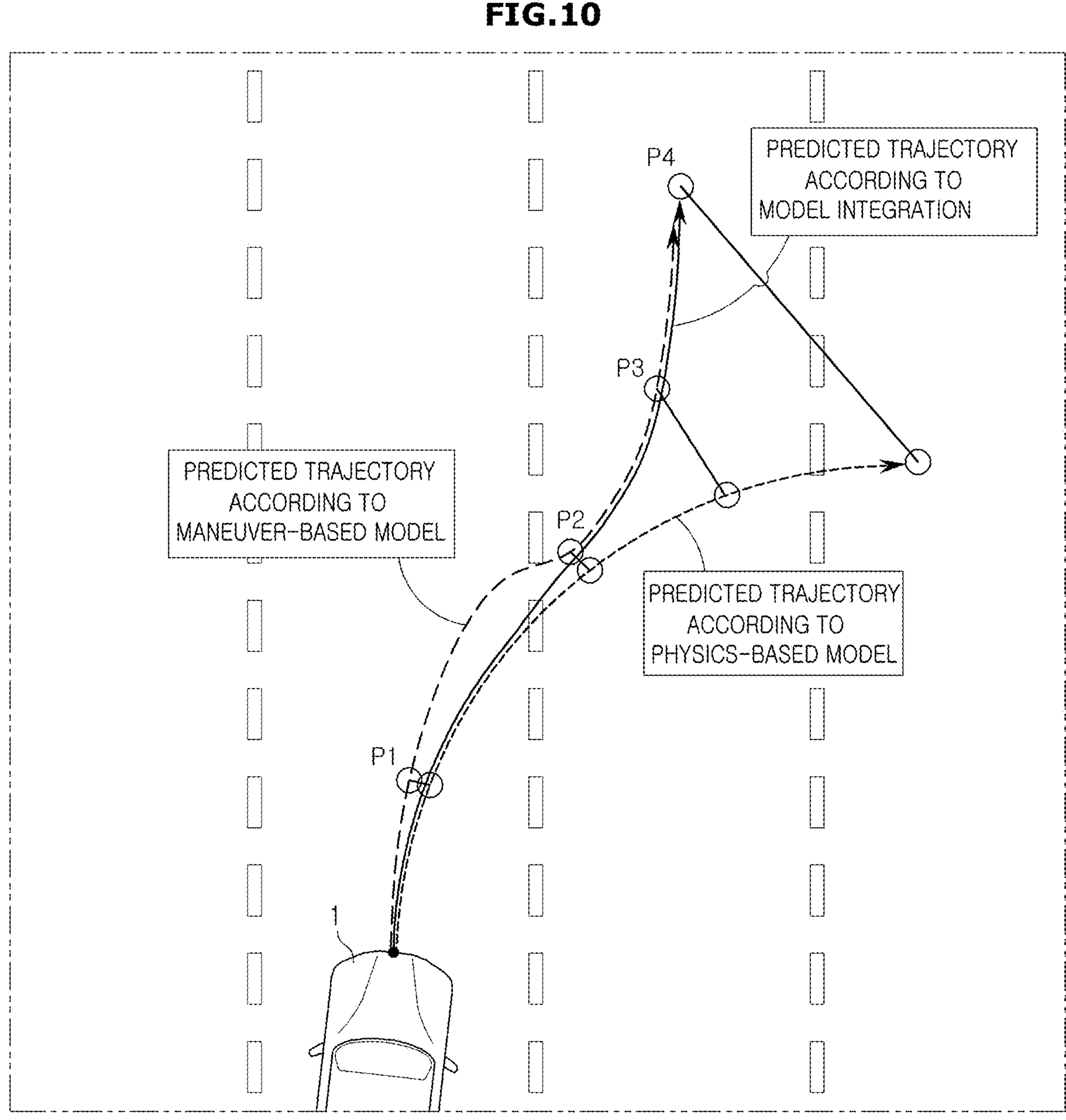
FIG. 10 is a diagram illustrating a predicted trajectory according to the physics-based model, a predicted trajectory according to the maneuver-based model, and a predicted trajectory according to the model integration for each prediction time in the vehicle according to an exemplary embodiment of the present disclosure.

FIG. 10 is a diagram illustrating a predicted trajectory according to the physics-based model, a predicted trajectory according to the maneuver-based model, and a predicted trajectory according to the model integration for each prediction time in the vehicle according to an embodiment.

Referring to FIG. 10, a one-second predicted position $P_1$, a two-second predicted position $P_2$, a three-second predicted position $P_3$, and a four-second predicted position $P_4$ are illustrated.

A predicted trajectory according to the model integration is generated by connecting each trajectory to which the weighting of the predicted trajectory according to the physics-based model and the weighting of the predicted trajectory according to the maneuver-based model are applied at the positions $P_1$, $P_2$, $P_3$, and $P_4$ at each prediction time.

Figure 11:
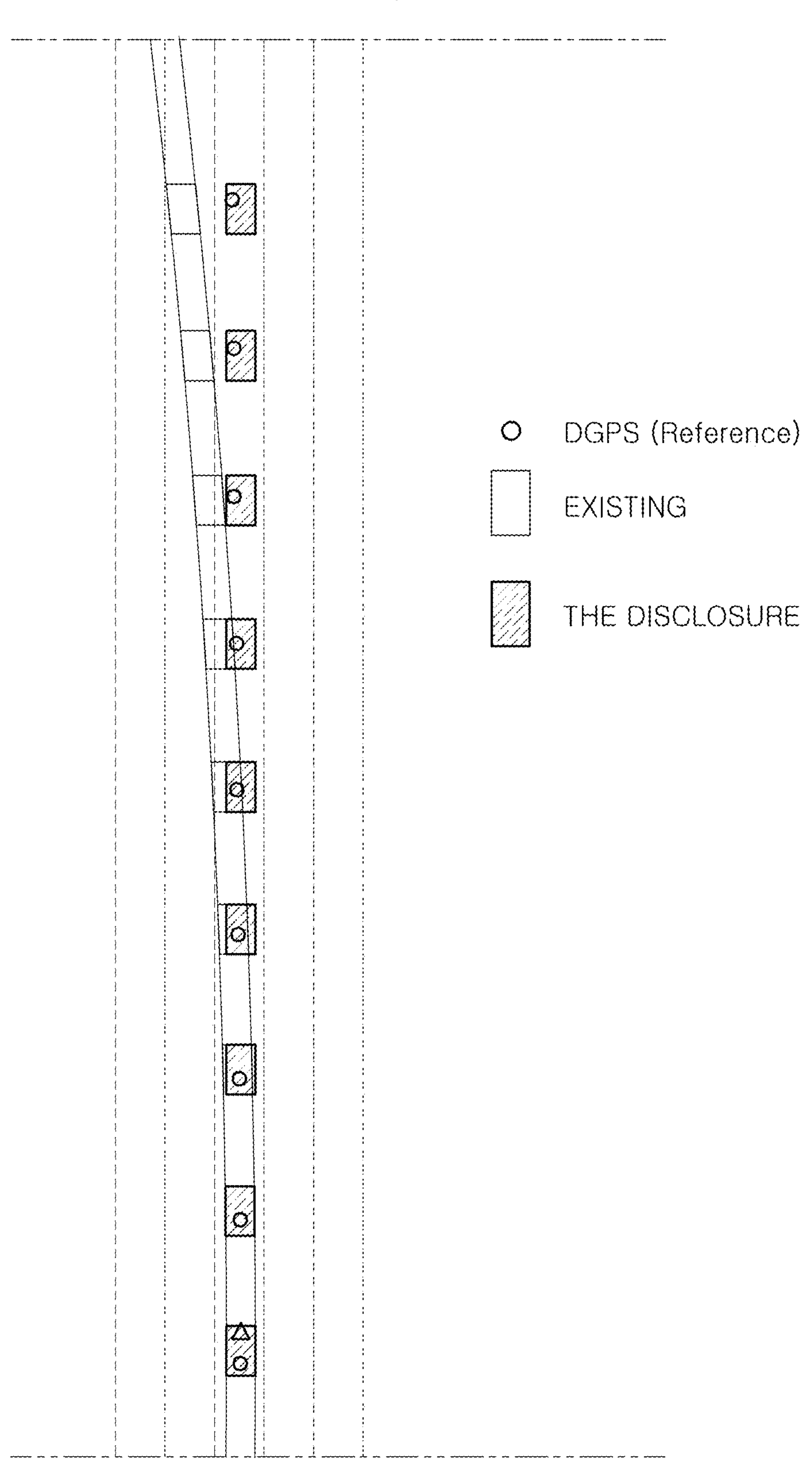
FIG. 11 illustrates a comparison result between the physics-based model and the integrated model for lane keeping of the vehicle according to an exemplary embodiment of the present disclosure.

FIG. 11 illustrates a comparison result between the physics-based model and the integrated model for lane keeping of the vehicle according to an embodiment.

Referring to FIG. 11, a scenario in which the vehicle 1 keeps the lane thereof is illustrated.

A trajectory prediction result according to the integrated model of the disclosure, a trajectory prediction result according to the existing physics-based model, and an actual result according to installation of a differential global positioning system (DGPS) are illustrated together.

When the vehicle 1 keeps the lane thereof, because the physics-based model has the high prediction accuracy in a short prediction interval, but is affected by sensor noise in a long prediction interval, even in a situation in which the vehicle 1 keeps the lane, the physics-based model may predict an incorrect trajectory that the vehicle 1 changes the lane.

It may be seen that the trajectory prediction according to the integrated model has little error with the DGPS result. Therefore, it may be seen that the integrated model has the high prediction accuracy equally in both of the short prediction interval and the long prediction interval.

Figure 12:
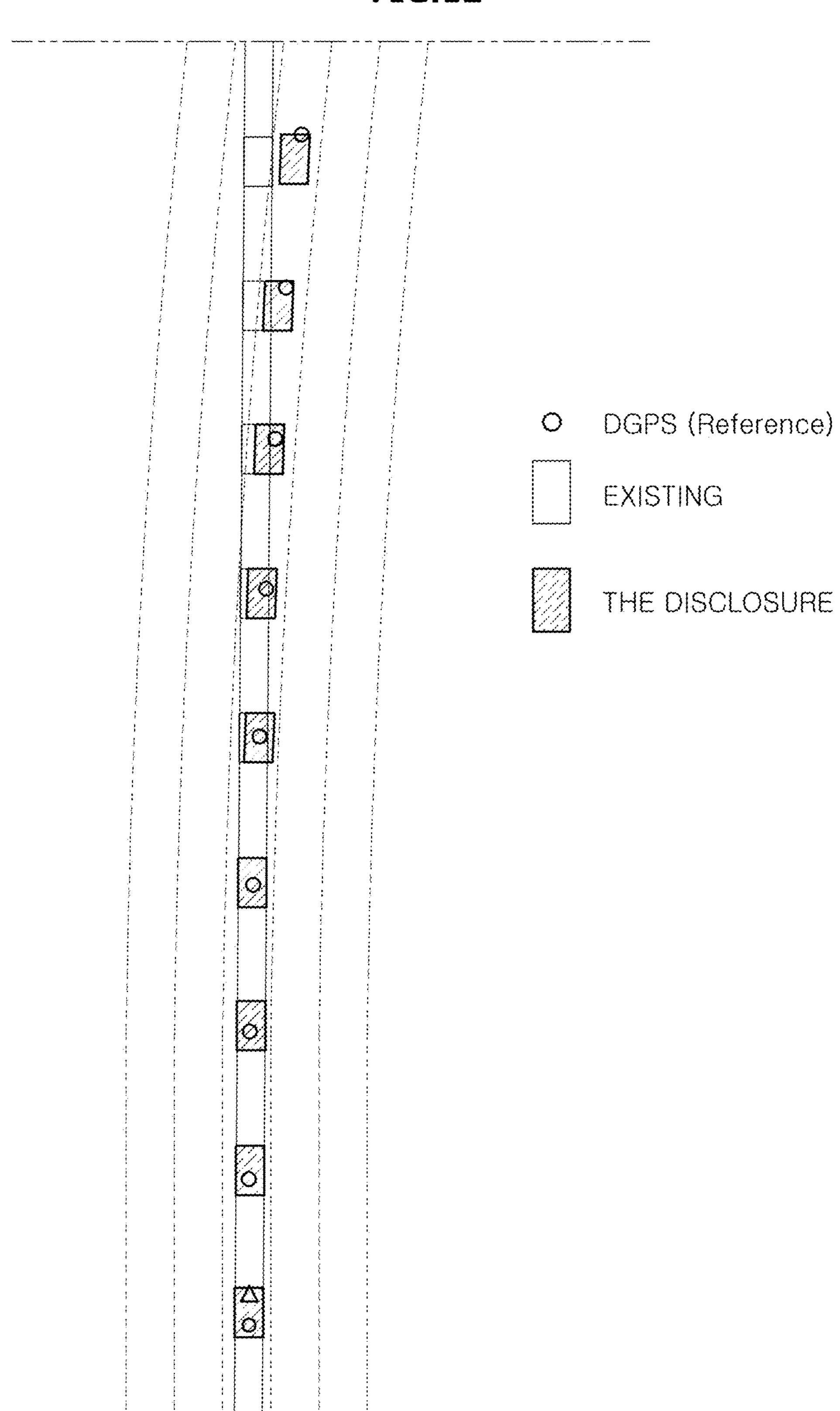
FIG. 12 illustrates another comparison result between the physics-based model and the integrated model for lane keeping of the vehicle according to an exemplary embodiment of the present disclosure.

FIG. 12 illustrates another comparison result between the physics-based model and the integrated model for lane keeping of the vehicle according to an embodiment.

Referring to FIG. 12, a scenario in which the vehicle 1 keeps the lane thereof on a curved road is illustrated.

A trajectory prediction result according to the integrated model of the disclosure, a trajectory prediction result according to the existing physics-based model, and an actual result according to installation of the DGPS are illustrated together.

When the vehicle 1 keeps the lane thereof on a curved road, because the physics-based model uses only the maneuver data of the vehicle 1 and does not utilize the lane information, even though a curvature of the road changes, the physics-based model does not reflect this change, and so the physics-based model may predict an incorrect trajectory that the vehicle 1 travels straight, unlike the reality.

However, because the lane ahead is curved, the integrated model predicts that the vehicle 1 will travel along the lane, and thus the integrated model may predict the same trajectory as the actual one.

Therefore, it may be seen that the trajectory prediction according to the integrated model has little error with the DGPS result. In addition, it may be seen that the integrated model has the high prediction accuracy equally in both of the short prediction interval and the long prediction interval.

According to one aspect of the disclosure, a trajectory of a vehicle can be more accurately and reliably predicted.

Herein, the aforementioned controller and/or components thereof may include one or more processors/microprocessors combined with a computer-readable recording medium storing computer-readable code/algorithm/software. The processors/microprocessors may execute the computer-readable code/algorithm/software stored in the computer-readable recording medium to perform the above-described functions, operations, steps, and the like.

The above-described controller and/or components thereof may further include a memory implemented as a computer-readable non-transitory recording medium or a computer-readable temporary recording medium. The memory may be controlled by the aforementioned controller and/or components thereof, and may be configured to store data transferred to or received from the aforementioned controller and/or components thereof, or may be configured to store data processed or to be processed by the aforementioned controller and/or components thereof.

The disclosed embodiments may be implemented as computer-readable code/algorithm/software on a computer-readable recording medium. The computer-readable recording medium may be a computer-readable non-transitory recording medium such as a data storage device capable of storing data readable by a processor/microprocessor. Examples of computer-readable recording media include hard disk drives (HDDs), solid state drives (SSDs), silicon disk drives (SDDs), read-only memory (ROM), compact disc read-only memory (CD-ROMs), magnetic tapes, floppy disks, optical data storage devices, etc.

The controller CLR of the apparatus according to an exemplary embodiment of the present disclosure may be a processor (e.g., computer, microprocessor, central processing unit (CPU), application-specific integrated circuits (ASIC), circuitry, logic circuits, etc.). The controller may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

What is claimed is:

1. A vehicle including:

a maneuver sensor provided to obtain maneuver data of the vehicle;

a vehicle environment sensor provided to obtain lane information of a road on which the vehicle is traveling;

a steering device provided to change the traveling direction of the vehicle;

a braking device provided to stop the vehicle;

an accelerator provided to move the vehicle; and a controller electrically connected to the vehicle environment sensor, the steering device, the braking device and the accelerator, wherein the controller predicts a first trajectory of the vehicle based on a physics-based model using the maneuver data, predicts a second trajectory of the vehicle based on a maneuver-based model using the maneuver data and the lane information, and predicts a final trajectory of the vehicle based on the first trajectory and the second trajectory;

wherein the controller is configured to apply a weighting to the first trajectory and the second trajectory based on an integrated model integrating the physics-based model and the maneuver-based model, and predict the final trajectory based on trajectories to which the weighting is applied;

wherein the controller is configured to apply a weighting to the first trajectory and the second trajectory depending on prediction time for predicting the trajectory of the vehicle, and predict the final trajectory based on the first trajectory and the second trajectory to which the weighting is applied;

wherein the controller is configured to predict the first trajectory as the final trajectory in a first prediction time interval, predict the final trajectory by applying the weighting to the first trajectory and the second trajectory in a second prediction time interval set longer than the first prediction time interval, and predict the second trajectory as the final trajectory in a third prediction time interval set longer than the second prediction time interval;

wherein the controller is configured to generate a final trajectory by connecting the final trajectory determined in the first prediction time interval, the final trajectory determined in the second prediction time interval and the final trajectory determined in the third prediction time interval; and wherein the controller is configured to control the steering device, the braking device and the accelerator based on the final trajectory.

2. The vehicle according to claim 1, wherein the physics-based model includes at least one of a constant velocity model (CV model) and a constant acceleration model (CA model).

3. The vehicle according to claim 2, wherein the controller predicts a relative longitudinal position and relative lateral position of the vehicle depending on acceleration and a yaw rate of the vehicle assuming that the vehicle travels at constant acceleration based on the CA model, and predicts the first trajectory based on the relative longitudinal position and relative lateral position.

4. The vehicle according to claim 1, wherein the maneuver-based model simulates a driving pattern of a driver using the maneuver data and the lane information.

5. The vehicle according to claim 1, wherein the maneuver-based model is a cubic polynomial curve model.

6. The vehicle according to claim 5, wherein the controller identifies a driving pattern of a driver based on the cubic polynomial curve model, predicts a maneuver of the vehicle according to the driving pattern, and predicts the second trajectory based on the predicted maneuver.

7. The vehicle according to claim 5, wherein the controller derives an initial position and a final position of the vehicle from the cubic polynomial curve model, derives initial position conditions and final position conditions, determines model parameters including a lateral offset, lane heading angle, curvature, and curvature derivative based on the initial position conditions and the final position conditions, and predicts the second trajectory by applying the model parameters to the cubic polynomial curve model.

8. The vehicle according to claim 1, wherein the controller applies a weighting to the first trajectory and the second trajectory according to a sigmoid function.

9. The vehicle according to claim 8, wherein the controller applies the weighting of the first trajectory higher than the weighting of the second trajectory as the prediction time is short, and applies the weighting of the second trajectory higher than the weighting of the first trajectory as the prediction time is long.

10. A control method of a vehicle including:

obtaining maneuver data of the vehicle;

obtaining lane information of a road on which the vehicle is traveling;

predicting a first trajectory of the vehicle based on a physics-based model using the maneuver data;

predicting a second trajectory of the vehicle based on a maneuver-based model using the maneuver data and the lane information; and predicting a final trajectory of the vehicle based on the first trajectory and the second trajectory, wherein the predicting of the final trajectory of the vehicle includes:

applying a weighting to the first trajectory and the second trajectory based on an integrated model integrating the physics-based model and the maneuver-based model;

predicting the final trajectory based on trajectories to which the weighting is applied;

applying a weighting to the first trajectory and the second trajectory depending on prediction time for predicting the trajectory of the vehicle;

predicting the final trajectory based on the first trajectory and the second trajectory to which the weighting is applied;

predicting the first trajectory as the final trajectory in a first prediction time interval;

predicting the final trajectory by applying the weighting to the first trajectory and the second trajectory in a second prediction time interval set longer than the first prediction time interval;

predicting the second trajectory since the final trajectory in a third prediction time interval set longer than the second prediction time interval; and generating a final trajectory by connecting the final trajectory determined in the first prediction time interval, the final trajectory determined in the second prediction time interval and the final trajectory determined in the third prediction time interval, wherein the control method of the vehicle including:

changing the traveling direction of the vehicle by a steering wheel;

stopping the vehicle by a braking device;

moving the vehicle by an accelerator; and controlling the steering device, the braking device and the accelerator based on the final trajectory.

11. The control method according to claim 10, wherein the predicting of the first trajectory of the vehicle includes:

predicting a relative longitudinal position and relative lateral position of the vehicle based on the physics-based model including at least one of a constant velocity model (CV model) and a constant acceleration model (CA model); and predicting the first trajectory based on the relative longitudinal position and relative lateral position.

12. The control method according to claim 10, wherein the predicting of the second trajectory of the vehicle includes:

identifying a driving pattern of a driver based on the maneuver-based model including a cubic polynomial curve model;

predicting a maneuver of the vehicle according to the driving pattern; and predicting the second trajectory based on the predicted maneuver.

13. The control method according to claim 12, wherein the predicting of the second trajectory of the vehicle includes:

deriving an initial position and a final position of the vehicle from the cubic polynomial curve model;

deriving initial position conditions and final position conditions;

determining model parameters including a lateral offset, lane heading angle, curvature, and curvature derivative based on the initial position conditions and the final position conditions; and predicting the second trajectory by applying the model parameters to the cubic polynomial curve model.

14. The control method according to claim 10, wherein the predicting of the final trajectory of the vehicle includes:

applying a weighting to the first trajectory and the second trajectory according to a sigmoid function; and predicting the final trajectory based on the first trajectory and the second trajectory to which the weighting is applied.

15. The control method according to claim 14, wherein the applying of the weighting to the first trajectory and the second trajectory includes:

applying the weighting of the first trajectory higher than the weighting of the second trajectory since a prediction time of the sigmoid function is short; and applying the weighting of the second trajectory higher than the weighting of the first trajectory since the prediction time is long.

* * * * *